UNITED STATES PATENT OFFICE.

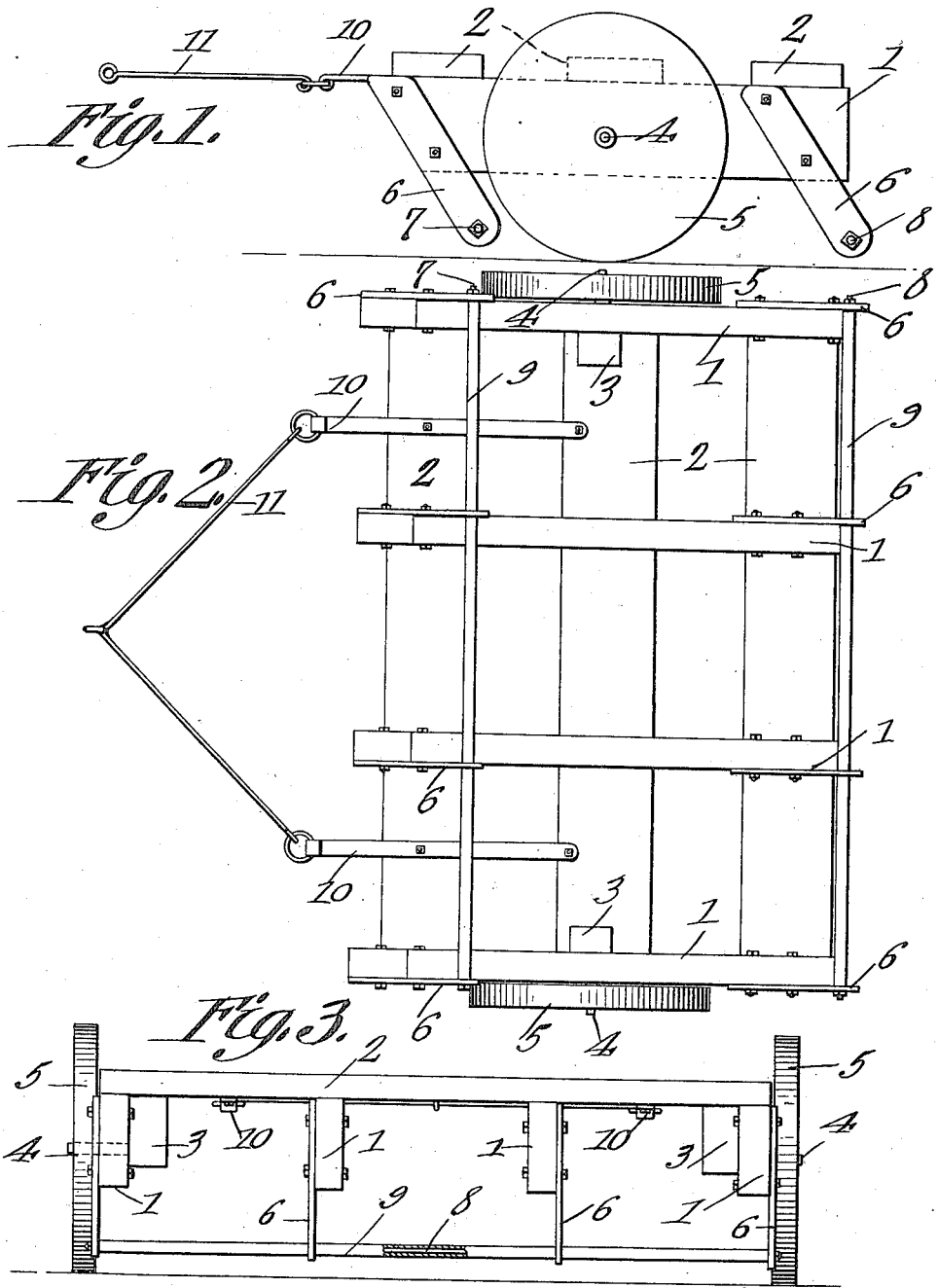

JAMES TOMLIN, OF MORO, OREGON, ASSIGNOR OF ONE-HALF TO RICHARD T. MORGAN, OF MORO, OREGON.

WEED-REMOVER.

1,152,574.         Specification of Letters Patent.      Patented Sept. 7, 1915.

Application filed September 21, 1914. Serial No. 862,839.

*To all whom it may concern:*

Be it known that I, JAMES TOMLIN, a citizen of the United States, residing at Moro, in the county of Sherman and State of Oregon, have invented a new and useful Weed-Remover, of which the following is a specification.

This invention relates to machines for removing weeds and other undesirable vegetation from fields, one of the objects being to provide a simple, durable and compact structure of this character which, when drawn over a field, will engage the weeds in the path thereof and tear them out of the soil, the said weeds being dragged along the ground until the machine reaches a point where it is desired to discharge same whereupon the weeds are released and left in a pile.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings, the preferred form of the invention has been shown.

In said drawings: Figure 1 is a side elevation of the machine. Fig. 2 is a bottom plan view thereof. Fig. 3 is a rear elevation, parts being broken away.

Referring to the drawings by characters of reference 1 designates parallel longitudinally extending frame members on which are secured transversely extending boards 2 forming an open platform on which the person operating the machine is adapted to ride. Brackets 3 are secured to the inner sides of the side members 1 at the centers thereof and to the end portions of the adjacent board 2, these brackets having spindles 4 extending upwardly through the outer side strips 1 and which spindles engage supporting wheels 5.

Extending downwardly from the front and rear ends of each of the members 1 are rearwardly inclined hangers 6, those hangers depending from the front ends of the frame members 1 being connected at their lower ends, by a transverse rod 7, while a similar rod 8 connects the lower ends of the rear hangers 6. Journaled on each of these rods 7 and 8 are rollers 9, said rollers fitting close to the hangers 6 and all of the rollers being out of contact with the surface of the ground when the members 1 are horizontal. Bars 10 may be extended forwardly from the boards 2 and any suitable draft means indicated generally at 11 may be connected to these bars.

In using the machine herein described, the driver stands upon the rear portion of the machine so as thus to tilt the said machine about the axis of the wheels 5 and cause the rollers 9 on the rear rod 8 to press downwardly against the ground. Consequently, as the machine is drawn forward, these rollers, which are very small, will dig into the soil and pull on the weeds so as to remove them by the roots, these weeds or other vegetable growth accumulating in front of the rollers 9 on the rod 8 and piling up under the members 1 and the rear board 2. After a considerable number of weeds, etc., have thus been accumulated, the driver leaves his position upon the rear portion of the machine and steps forwardly onto the front board 2. This results in elevating the rear end of the machine so that as the machine moves forward, the rollers 9 on the front rod 7 will travel along the ground while the weeds and other vegetation accumulated by the rear rollers 9 will be released and left in a pile upon the ground. The operation can then be repeated as before.

While the machine described operates efficiently to remove weeds and the like, it is also useful in that it will mulch the surface so that moisture will be retained the better.

What is claimed is:—

1. A machine of the class described including supporting wheels, a frame carried thereby and balanced therebetween, means upon the front and rear portions of the frame for supporting a driver, and means connected to and extending transversely under the front and rear portions of the frame for engaging and loosening the surface of the ground when the weight of the driver is applied to the front and rear portions of the frame respectively.

2. A machine of the class described including supporting wheels, a frame carried thereby and balanced therebetween, means upon the front and rear portions of the frame for supporting a driver, means connected to and extending transversely under the front and rear portions of the frame for engaging and loosening the surface of the ground when the weight of the driver is applied to the front and rear portions of the frame respectively, said means including hangers, a transverse rod connecting the lower ends of the hangers, and rollers mounted on the rod between the hangers.

3. In a machine of the class described, the combination with a frame and means upon the front and rear portions thereof for supporting a driver, of supporting wheels connected to the sides of the frame, said frame being balanced therebetween, downwardly and rearwardly inclined hangers connected to the front and rear portions respectively of the hanger, and means extending transversely of the machine and connecting the lower end portions of the hangers for engaging and loosening the surface of the soil when the weight of the driver is applied to the front or to the rear portion of the machine respectively.

In testimony that I claim the foregoing as my own, I have hereto affixed my signature in the presence of two witnesses.

JAMES TOMLIN.

Witnesses:
R. J. GINN,
R. T. MORGAN.

Copies of this patent may be obtained for five cents each, by addressing the "Commissioner of Patents, Washington, D. C."